United States Patent [19]
Kozlovsky et al.

[11] Patent Number: 5,084,840
[45] Date of Patent: Jan. 28, 1992

[54] PASSIVE ABSORPTIVE RENSONATOR LASER SYSTEM AND METHOD

[75] Inventors: William J. Kozlovsky; William P. Risk, both of Mountain View, Calif.

[73] Assignee: International Business Machines Corporation, Armonk, N.Y.

[21] Appl. No.: 673,878

[22] Filed: Mar. 22, 1991

Related U.S. Application Data

[62] Division of Ser. No. 582,286, Sep. 12, 1990.

[51] Int. Cl.$^5$ .............................................. G11C 13/00
[52] U.S. Cl. ..................................................... 365/106
[58] Field of Search .......................... 365/106; 372/92

Primary Examiner—Leon Scott, Jr.
Attorney, Agent, or Firm—Douglas R. Millett

[57] ABSTRACT

Pump laser light is focused into a solid state laser material. A resonator is positioned around the laser material. The resonator is comprised of reflectors which have high reflectivity at both the pump light frequency and the solid state laser light frequency. The resonator is impedance matched to the pump laser. The pump light resonates inside the solid state laser material until practically all of it is absorbed.

8 Claims, 2 Drawing Sheets

PASSIVE ABSORPTIVE RENSONATOR LASER SYSTEM AND METHOD

This is a division of application Ser. No. 07/582,286, filed 09/12/90.

BACKGROUND OF THE INVENTION

1. Field of the Invention

This invention relates to laser systems and more particularly to a laser system having a pump laser resonator.

2. Description of the Prior Art

Diode pumped solid state lasers are of interest because of their compact size, long life times and efficient operation. In these types of systems, light from a pump laser is used to excite the solid state laser material (crystal) to lase. The solid state material typically has a strong absorption at the pump laser wavelength, so that a crystal a few millimeters in length efficiently absorbs most of the pump laser output power.

If the solid state material has a weak absorption of the pump laser power, then the laser will have a low overall efficiency. This weak absorption can be caused by a number of factors. If the laser material has a low doping level, then the absorption can be weak because of the low concentration of active lasing ions. In addition, the pump laser may not be tunable to an absorption peak of the laser material. Finally, the solid state laser crystal may be of such a short length that efficient pump light absorption is not possible.

Short length laser crystals are, however, desirable for a number of reasons. Optical storage systems require that the laser size be kept to a minimum. Shorter crystals have less power loss at the lasing wavelength and avoid the scattering and reabsorption problems which occur in longer length crystals Shorter crystals can also provide laser light at a single frequency, whereas longer crystals have a tendency to produce laser light at a plurality of closely spaced frequencies.

What is needed is a way to increase the pump radiation absorption in a laser system so that smaller crystals can be used.

SUMMARY OF THE INVENTION

In accordance with the present invention, a laser system comprises a pump laser which provides pump light. A lens focuses the pump light into a solid state laser material. A resonator is positioned around the laser material. The resonator is comprised of mirrors which have high reflectivity at the pump light frequency and the laser light frequency and resonates at both the pump light and laser light frequencies. The result is that the pump light resonates inside the solid state laser material until practically all of the pump light is absorbed.

For a fuller understanding of the nature and advantages of the present invention reference should be made to the following detailed description taken in conjunction with the accompanying drawings.

DESCRIPTION OF THE PREFERRED EMBODIMENTS

Figure 1:
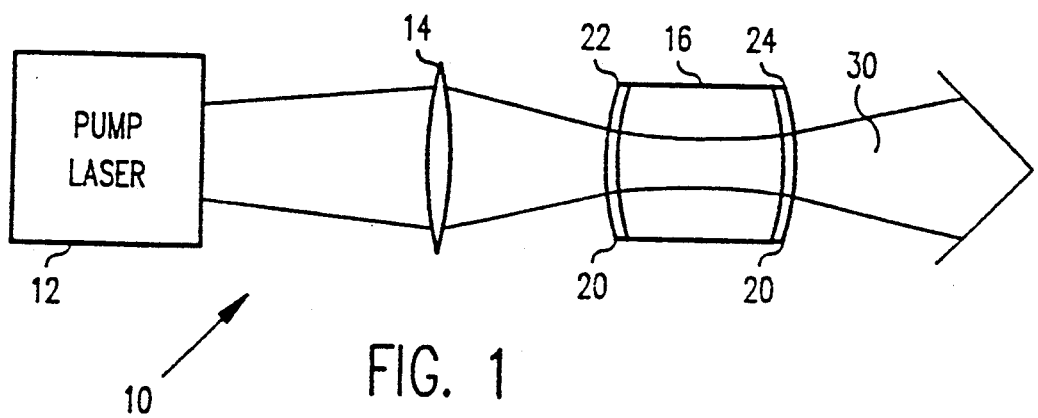
FIG. 1 is a schematic diagram of a laser system of the present invention.

FIG. 1 shows a schematic diagram of a laser system of the present invention which is designated by the general reference number 10. System 10 comprises generally a pump laser 12, a lens 14 and a solid state laser material 16. Pump laser 12 may be a diode laser, such as GaAlAs (Gallium Aluminum Arsenide) which outputs light in the 780–860 nm range. The light from the pump laser is focused by lens 14 onto solid state laser material 16.

Laser material 16 may be a Nd:YAG crystal (Neodymium doped, Yttrium Aluminum Garnet), although other laser materials may also be used. For a Nd:YAG crystal the solid state laser light may have a wavelength of approximately 946 nm. The laser material 16 is surrounded by a resonator 20 comprised of a mirror coating 22 and a mirror coating 24. Mirrors 22 and 24 are reflective at both the pump laser light frequency and the solid state laser light frequency and may be transmissive at other frequencies. This is in contrast to the prior art which had reflective coatings only at the solid state laser frequency and were highly transmissive at the pump light frequency. Mirror 24 is highly reflective (80–100 and preferably 100%) for the pump light frequency and has a reflectivity for the solid state laser light frequency chosen to maximize the solid state laser output (typically greater than 95%). Mirror 22 is chosen to be highly reflective (80–100 and preferably 100%) for the solid state laser light frequency and to have a reflectivity R1 for the pump light frequency. The reflectivity R1 is chosen such that resonator 20 will impedance match the pump laser 12, so that the pump light reflected back toward pump laser 12 is minimized and the coupled light (pump light which is trapped in resonator 20) is maximized. The reflectivity R1 should be chosen such that $R1 = (1 - e^{-2\alpha L}) * (R2)$, where $\alpha$ is the absorption coefficient of the material 16, L is the length of the beam path between mirrors 22 and 24 and R2 is the reflectivity of mirror 24 at the pump light frequency. A more detailed explanation of impedance matching is given in the article by W. J. Kozlovsky, et al., "Efficient Second Harmonic Generation of a Diode-Laser-Pumped Cd Nd:YAG Laser," IEEE J. Quantum Electronics, Vol. QE-24, No. 6, p. 913, (1988).

The mirror coatings 22 and 24 are made of a multilayer dielectric coatings as is known in the art. The layers may be made of $SiO_2$ and $TiO_2$ in alternating layers. These coatings are deposited directly onto laser material 16. However, separate mirrors on either side of material 16 may also be used.

If the reflectivity R1 that is deposited is somewhat higher than optimum for impedance matching at the peak absorption wavelength, the pump wavelength can be adjusted slightly such that impedance matching is preserved. The pump laser current or temperature can be adjusted such that the pump laser frequency is exactly resonant with the solid state cavity resonator 20, and almost all of the pump laser power will then couple into the solid state laser material 16, providing efficient operation. The absorption of the pump light in the laser material implies that the finesse of the solid state resonator 20 at the pump laser light wavelength will be fairly low (a 5% single pass pump absorption will yield a finesse of 64), resulting in broad resonances peaks to which the pump laser can be easily locked. The finesse is a measure of the frequency range of the resonance peaks.

In operation, light from the pump laser 12 is focused onto resonator 20 by lens 14. The pump light is reflected back and forth between mirrors 22 and 24 until it is absorbed by the solid state material 16. Lens 14 focuses the pump light in such a way that the pump light entering resonator 20 is spatially mode matched to the pump light which is already being reflected back and forth inside resonator 20. Spatial mode matching is discussed in more detail in the article "Laser Beams and Resonators," *Applied Optics*, Vol. 5, pp. 1550-1567, October 1966. Because the resonator 20 is impedance matched to pump laser 12, a maximum amount of pump light is coupled into resonator 20 and only a small fraction will be reflected back at mirror 22.

Once the pump light is absorbed by material 16, material 16 will lase and the solid state laser light is produced. The solid state laser light is reflected back and forth in resonator 20 until it exits as solid state laser light beam 30.

Figure 2:
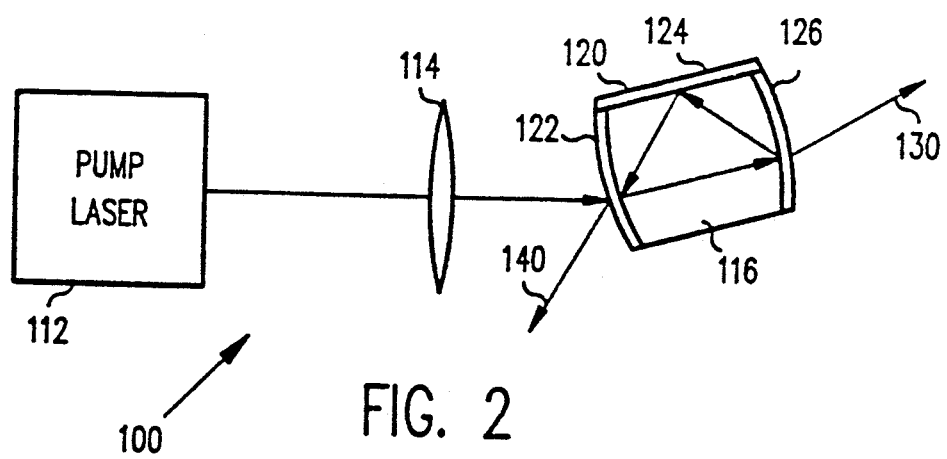
FIG. 2 is a schematic diagram of an alternative embodiment of the present invention.

FIG. 2 shows a second embodiment of a laser system of the present invention and is designated by the general reference number 100. System 100 comprises a pump laser 112 which is preferably a diode laser. Laser 12 may be a GaAlAs diode laser, although other types of lasers may be used. The pump light is focused by a lens 114 into a solid state laser material 116. Material 116 may be a Nd:YAG crystal, although other laser materials may also be used. For a Nd:YAG crystal the solid state laser light may have a wavelength of approximately 946 nm. Material 116 is surrounded by a ring resonator 120. Ring resonator 120 is comprised of 3 mirrors, 122, 124 and 126. Mirror 124 may alternatively be a polished surface to provide total internal reflection. Mirrors 122, 124 and 126 are dielectric mirror coatings made directly on material 116. However, separate mirrors could also be used.

Mirror 124 is highly reflective (80-100% and preferably 100%) for both the pump and solid state laser light frequencies. Mirror 126 is highly reflective (80-100% and preferably 100%)for the pump light frequency and has a reflectivity for the solid state laser light frequency chosen to maximize the solid state laser light output (typically greater than 95%).

Mirror 122 is chosen to be highly reflective (80-100% and preferably 100%) for the solid state laser light frequency and has a reflectivity R1 for the pump light frequency. The reflectivity R1 is chosen such that resonator 120 will impedance match the pump laser 112. The reflectivity R1 should be chosen such that $R1 = (1 - e^{-2\alpha L})*(R2)*(R3)$, where $\alpha$ is the absorption coefficient of material 116, L is the average length of the beam path around one circuit inside resonator 120, R2 is the reflectivity of mirror 124 at the pump light frequency and R3 is the reflectivity of mirror 126 at the pump light frequency.

In operation, light from pump laser 112 is coupled into resonator 120 by lens 114. The pump light is reflected around resonator 120 in a counter-clockwise direction. The beam pattern of the incoming pump light is spatially mode matched to the beam pattern of the pump light already being reflected inside the resonator 120. The pump light is absorbed by material 116 and the solid state laser light is produced which is also reflected in resonator 120 in a counter-clockwise direction. The solid state laser light then exits at mirror 126 as a laser beam 130.

Note, that even though the resonator is impedance matched to pump laser 112 a small fraction of pump light is reflected back at mirror 122 as a beam 140. In this case, the beam 140 is not directly reflected back into pump laser 112 and potential problems of interference with pump laser 112 are avoided.

The present invention thus provides a laser system which resonates the pump light inside the laser material. This provides for increased pump light absorption and greatly increases the overall efficiency of the laser system. Although two embodiments have been shown, other resonator designs are possible which use laser systems which are not solid state or diode laser pumped.

Figure 3:
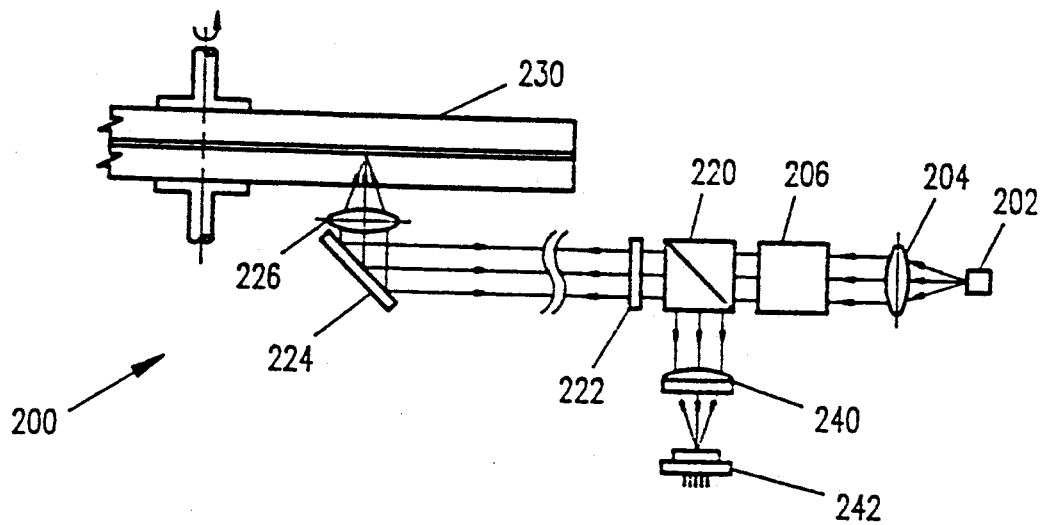
FIG. 3 is a schematic diagram of a data storage system of the present invention.

FIG. 3 shows a phase change optical disk drive system 200 which uses a laser system 202 of the present invention. Laser system 10 or 100 may be used for system 202. The light from system 202 is collimated by a lens 204 and passes to a circularizing optical element 206. Element 206 emits light having a circular cross-sectional beam pattern. Element 206 may be a prism.

The light then passes through a polarizing beam splitter 220 and a quarter-wave plate 222. The light is reflected off of a mirror 224 and focussed by a lens 226 onto an optical recording medium 230. Medium 230 may be a phase change type of optical recording medium.

The light reflected from medium 230 returns through lens 226, is reflected off of mirror 224, passes through plate 222 to beam splitter 220. The reflected light is then diverted by beam splitter 220 to astigmatic lens 240. Lens 240 focuses the reflected light onto an optical detector 242. The recorded spots of the media 230 have different reflectivities and these differences are detected by optical detector 242 as data ones and zeros. Detector 242 also provides tracking and focus signals.

Figure 4:
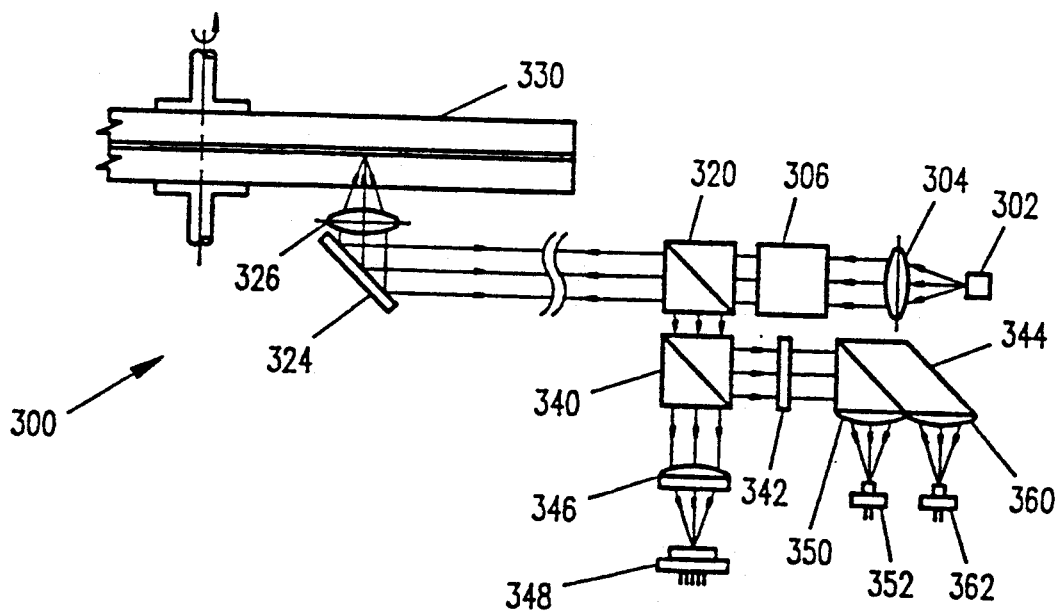
FIG. 4 is a schematic diagram of an alternative embodiment of a data storage system.

FIG. 4 shows a magneto-optic disk drive system 300 which uses a laser system 302 of the present invention. Laser system 302 may be system 10 or system 100. The light from system 302 is collimated by a lens 304 and passes to a circularizing optical element 306. Element 306 emits light having a circular cross-sectional beam pattern. Element 306 may be a prism.

The light then passes through a leaky polarizing beam splitter 320. Beam splitter 320 has reflectivities of $Rp > 0$ and Rs approximately equal to one (p and s represent the orthogonal polarization components of the light). The light is then reflected off of a mirror 324 to a lens 326 and is focussed onto an optical recording medium 330. Medium 330 may be a magneto-optic type of optical recording medium.

The light reflected from medium 330 returns through lens 326, reflects off of mirror 324 and enters beam splitter 320. Beam splitter 320 diverts the reflected light to an amplitude beam splitter 340. Reflected data light is diverted to a half wave plate 342 and to a beam splitter 344. Reflected light of other amplitudes passes straight through beam splitter 340. This light is focused by an astigmatic lens 346 to a quad detector 348 to produce tracking and focus signals.

Medium 330 has recorded spots having either an up or down magnetic domain. The plane of polarization of light reflected off of these spots is rotated one way or the other depending upon the direction of magnetic domain. Beam splitter 344 separates the reflected light depending upon which way the plane of polarization has been rotated. Separated beams go to a lens 350 and an optical detector 352 or to a lens 360 and an optical detector 362. The difference in output signals of detectors 352 and 362 are the data ones and zeros. A more detailed explanation of optical disk drive systems is given in "Gradient-Index Optics and Miniature Optics" SPIE, Vol. 935, p. 63 (1988) by Glenn T. Sincerbox.

The laser system of the present invention has other applications besides data storage. The present invention could be used in medial equipment, chemical testers and monitors, color displays, remote sensors, and laser printers, to name a few.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A laser data storage system comprising:
    a pump laser for generating pump light at a first frequency;
    a laser material in optical communication with a pump laser for receiving said pump light and for producing laser light at a second frequency;
    an optical resonator in which the laser material is located, the optical resonator having resonance at approximately said first frequency and approximately said second frequency;
    an optical recording medium;
    an optical transmission means for directing said second frequency light from the optical resonator to the optical recording medium; and
    optical reception means for receiving a reflected second frequency light beam from the optical recording medium and providing a data signal responsive thereto.

2. The system of claim 1, wherein the optical resonator comprises a pair of mirrors which are reflective of light at the first and second frequencies.

3. The system of claim 2, wherein the reflectivity of a first mirror at the first frequency equals approximately $(1-e^{-2\alpha L})*(R2)$, where $\alpha$ is the absorption coefficient of the laser material, L is the distance between the mirrors and R2 is the reflectivity of the second mirror at the first frequency.

4. The system of claim 1, wherein the laser material is Nd:YAG.

5. The system of claim 1, wherein the optical resonator comprises a plurality of mirrors made of dielectric coatings.

6. The system of claim 1, wherein the resonator is a ring resonator having three reflective surfaces.

7. The system of claim 6, wherein the reflectivity of a first mirror has a reflectivity at the first frequency equal to approximately $(1-e^{-2\alpha L})*(R2)*(R3)$ where $\alpha$ is the absorption coefficient of the laser material, L is the length of a beam path around the ring resonator, R2 is the reflectivity of the second mirror at the first frequency, and R3 is the reflectivity of the third mirror at the first frequency.

8. A method for a laser data storage system comprising:
    coupling a pump laser light into a laser material;
    resonating said pump laser light inside said laser material until all of said pump laser light has been absorbed;
    producing a laser light inside said laser material;
    resonating said laser light inside said laser material;
    directing said laser light to an optical data storage medium; and
    receiving a reflected light from said optical data storage medium and outputting a data signal responsive thereto.

* * * * *

UNITED STATES PATENT AND TRADEMARK OFFICE
CERTIFICATE OF CORRECTION

PATENT NO. : 5,084,840

DATED : January 28, 1992

INVENTOR(S) : W. J. Kozlovsky, et al.

It is certified that error appears in the above-identified patent and that said Letters Patent is hereby corrected as shown below:

On the title page:

In the Title

Replace "RENSONATOR" with --RESONATOR--.

Signed and Sealed this

First Day of June, 1993

Attest:

MICHAEL K. KIRK

Attesting Officer

Acting Commissioner of Patents and Trademarks